United States Patent [19]
Kniepkamp

[11] 3,752,951
[45] Aug. 14, 1973

[54] APPARATUS FOR WELDING WITH GRANULAR FLUX ON A ROTATABLE CYLINDRICAL SURFACE

[76] Inventor: Glenn E. Kniepkamp, 530 W. Smithfield St., Elizabeth Twp., Allegheny County, Pa. 15135

[22] Filed: May 25, 1972

[21] Appl. No.: 256,995

Related U.S. Application Data

[62] Division of Ser. No. 127,903, March 25, 1971, Pat. No. 3,692,971.

[52] U.S. Cl............ 219/73, 219/76, 219/130, 219/137, 219/160
[51] Int. Cl............................................. B23k 9/18
[58] Field of Search............ 219/73, 74, 126, 219/76, 136, 160, 137, 61; 29/125, 81 A, 81 J, 491; 125/11 CD, 38; 222/414; 198/211; 51/207; 15/236 R

[56] References Cited
UNITED STATES PATENTS
| | | | |
|---|---|---|---|
| 3,309,729 | 3/1967 | Dresser | 15/236 R |
| 691,184 | 1/1902 | Shickler | 29/125 |
| 2,689,367 | 9/1954 | Parker | 15/79 |
| 2,395,723 | 2/1946 | Chimielewski | 219/73 |

Primary Examiner—J. V. Truhe
Assistant Examiner—George A. Montanye
Attorney—Ralph H. Dougherty

[57] ABSTRACT

Apparatus for confining granular flux in the proximity of a welding torch when making an overlay on a cylindrical surface.

1 Claim, 2 Drawing Figures

APPARATUS FOR WELDING WITH GRANULAR FLUX ON A ROTATABLE CYLINDRICAL SURFACE

This is a division, of application Ser. No. 127,903, filed Mar. 25, 1971, now U.S. Pat. No. 3,692,971.

This invention relates to a method of preventing emission of noxious gases when overlaying aluminum bronze weld material on a steel base.

The method of making an aluminum bronze overlay used heretofore consists of welding a layer of aluminum bronze on the base by the inert-gas-shielded arc welding process. The shielding gas is argon or helium or a mixture of argon and helium. Several health hazards are associated with the process due to high arc temperatures and high ultraviolet and infra-red radiation. Trichlorethylene, and perchlorethylene which often are found in the air of an industrial plant surrounding the arc, are decomposed by radiation from the arc. Phosgene and other gases are produced in dangerous quantity, even where the trichlorethylene and perchlorethyelne concentrations are low. The high temperature involved in the gas-shielded arc welding process produces larger amounts of metal fumes than other welding processes. The fumes are given off as black smoke which causes the welders and others in the vicinity of the work to become nauseous, contract a high temperature, and show other signs of phosgene poisoning.

In addition to the health outlined above, the process causes a rough black film to be deposited on the weld bead. This deposit is tightly adherent to the bead and actually enters the pores of the weld metal. As this black film interferes with adherence of each subsequent pass, it must be ground off before a subsequent pass is made.

I have found that by employing the submerged arc welding process with the proper flux and shielding it with the proper gas mixture, I prevent the release of noxious fumes into the atmosphere.

When making an overlay on a cylindrical surface, granular flux admitted to the area of the weld tends to slide off the cylindrical surface, roll off it, or if the flux is molten, to run off the surface. In order to use my process, flux must be retained in the area of the weld until a skin has solidified on the molten weld bead.

It is the principal object of the subject invention to prevent the emission of noxious fumes and smoke when welding aluminum bronze overlays.

It is also an object to improve the quality of the weld.

It is a further object to reduce the amount of time required for a welder to make such weld.

It is also an object ot reduce the amount of shielding gas required in the welding process.

It is also an object to provide apparatus for retaining flux in the proper location until the weld has been made.

These and other objects will become more apparent by reference to the following specification and the appended drawing in which.

Figure 1:
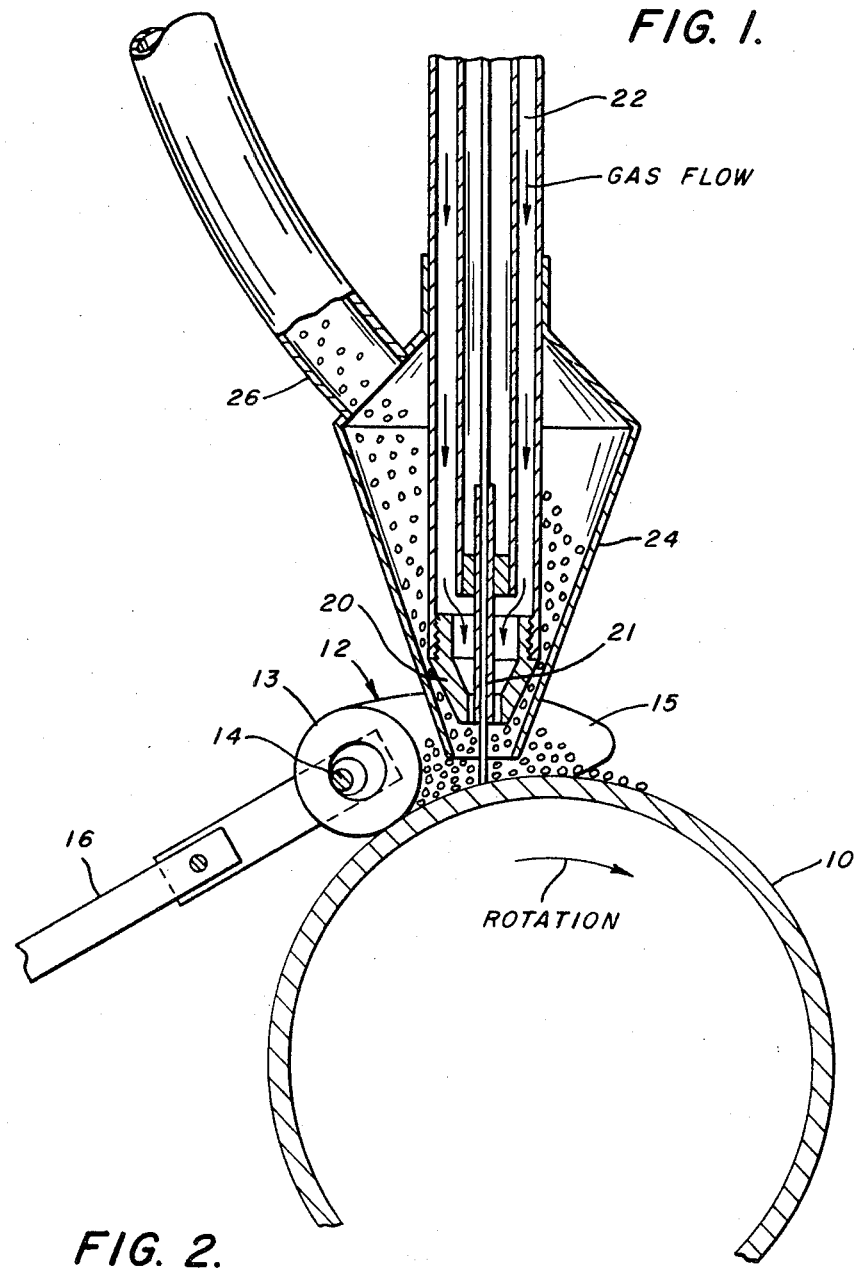
FIG. 1 is a cross-section of a piston, apparatus for overlaying aluminum bronze thereon, a welding torch and a flux fence.
Figure 2:
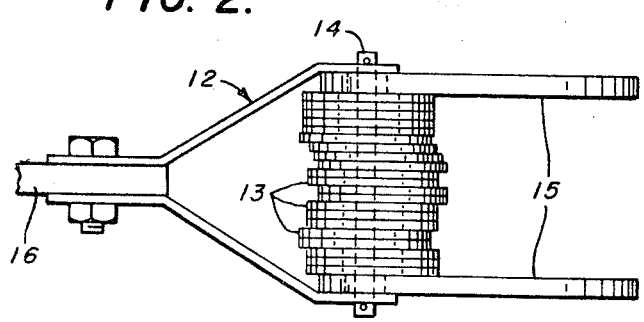
FIG. 2 is a partial plan view of the flux fence.

My invention is especially useful for overlaying aluminum bronze or worn pistons. FIG. 1 shows a piston 10 which is rotatably mounted in conventional means (not shown) for welding of an aluminum bronze overlay on the cylindrical surface thereof. A flux fence 12, which has a multiplicity of smooth, washer-like wheels 13 journaled on a shaft 14 and a pair of curved peripherally extending members or sides 15, is brought into contact with the piston. The fence is held in position by fixing support handle 16 in a tool holder or other conventional means (not shown). A welding head 20 includes means for continuously feeding a welding rod 21 therethrough, a passageway 22 for admitting shielding gas and a flux funnel 24. Flux is fed from a hopper, not shown, through sleeve 26 to flux funnel 24.

In operation, flux is fed from the funnel 24 onto the surface of piston 10 between sides 15 of fence 12. The wheels 13 and the sides 15 of the fence each have a large central opening through which shaft 14 passes. Thus each wheel is free to slide around shaft 14, rotate around shaft 14 or be angularly displaced with respect to any other wheel. Also, each side may move in its plane without moving the wheel adjacent to it. Aluminum bronze welding rod 21 is fed through the welding head to strike an arc between the base material and the welding rod and rotation of the piston is connected. After the piston has made one revolution an overlay is present which is the width of a single weld bead. The end wheel thereupon rides atop this bead and as more weld material is added, each successive wheel rides atop the overlay. Thus no flux is lost except for the excess which rides on the piston and falls off after passing the welding head. A shielding gas is introduced to the weld area through passageway 22 to shield the molten metal from the surrounding atmosphere.

It is critical to use an argon-helium mixture as the shielding gas. The mixture consists of between 10 and 60 percent argon with the remainder helium. The optimum gas composition is 20 percent argon, 80 percent helium. I have found the optimum gas flow rate to be 40 cubic feet per hour helium and 10 cubic feet per hour argon or a total rate of 50 cubic feet per hour. The prior method required a much greater argon flow, that is, 33 cubuc feet per hour argon as well as 25 cubic feet per hour helium or a total flowrate of 58 cubic feet per hour of shielding gas. Thus the prior method required 16 percent more shielding gas then does my invention.

It is critical to use a neutral flux, having a composition range as follows:

| | | | |
|---|---|---|---|
| $SiO_2$ | 18–25% | $P_2O_5$ | 0.03–.07% |
| $Al_2O_3$ | 25–35% | S | 0.01 max. |
| CaO | 8–13% | $TiO_2$ | 0.5–1.5% |
| MgO | 12–20% | FeO | 1.5–2.5% |
| MnO | 11–15% | $Na_2O$ | 1.0–2.0% |

My preferred flux composition range is as follows:

| | | | |
|---|---|---|---|
| $SiO_2$ | 21.0–23.0% | $P_2O_5$ | 0.05–0.07% |
| $Al_2O_3$ | 29.0–32.0% | S | 0.01 max. |
| CaO | 10.0–12.0% | $TiO_2$ | 0.8–1.2% |
| MgO | 16.0–18.0% | FeO | 2.0–2.3% |
| Mno | 13.0–14.0% | $Na_2O$ | 1.3–1.6% |

The optimum flux composition is as follows:

| | | | |
|---|---|---|---|
| $SiO_2$ | 22.3% | $P_2O_5$ | 0.06% |
| $Al_2O_3$ | 31.0% | S | 0.01 max. |
| CaO | 11.0% | $TiO_2$ | 1.02% |
| MgO | 17.0% | FeO | 2.2 |
| MnO | 14.0 | $Na_2O$ | 1.4% |

A suitable flux is commercially available from Lincoln Electric Company of Cleveland, Ohio, and carries their designation Lincoln 860.

The theory regarding the prevention of noxious fumes to which I subscribe but do not wish to be held is as follows:

Since aluminum reacts with chlorine instantaneously to form aluminum chloride, I believe that the high percentage of alumina in the flux, as well as the large amount of aluminum present in the welding rod, causes the aluminum chloride reaction to take place rather than the formation of toxic gases.

The overlay, when made by my process, has high integrity and is bright and shiny, having no trace of the black film present in the prior method. As a result, it is unnecessary to grind one pass before beginning another pass. This is a considerable saving in operating time.

Unexpectedly, it was found that only four welding passes are now required to cover the base metal to the depth overlay which previoulsy required five passes. Undoubtedly, a portion of the improvement is due to the fact that grinding is not required after each pass, but the remainder of the improvement is believed to be caused by the shape of the weld bead.

The appartus by which I perform my process is similar to that disclosed in Craig et al. U.S. Pat. No. 2,947,847. I differ from the teachings of this patent as I am making an overlay and not joining two pieces of metal; my weld metal is aluminum bronze, a different material, and I employ a different flux from that of the reference.

It is readily apparent from the foregoing that I have invented a method and apparatus for overlaying weld metal which prevents emission of noxious gases during the performance of the method, yields an improved quality weld, yet requires less time and less shielding gas than in prior methods.

I claim:

1. Apparatus for welding with granular material on a rotating cylindrical surface having a welding tool and a flux fence for holding said material on said surface until such said material has passed a predetermined point, the improvement in said fence comprising:

a support member;

a shaft fixed to said support member;

a plurality of wheels loosely journaled on said shaft in such manner to allow independent vertical movement of each of said wheels relative to any other wheel; and a pair of peripherally extending members loosely journaled on said shaft external to said wheels on opposite ends of said shaft and adapted to engage said cylindrical surface, whereby any of said wheels and said peripherally extending members can ride over an irregularity of said cylindrical surface without causing like members to do so.

* * * * *

UNITED STATES PATENT OFFICE
CERTIFICATE OF CORRECTION

Patent No. 3,752,951   Dated August 14, 1973

Inventor(s) Glenn E. Kniepkamp

It is certified that error appears in the above-identified patent and that said Letters Patent are hereby corrected as shown below:

Column 1, line 28, after "health" insert -- hazard --; line 41, after "off", second occurrence, insert -- of --. Column 2, line 38, after "total", insert -- flow --; line 57, "Mno" should read -- MnO --.

Signed and sealed this 12th day of February 1974.

(SEAL)
Attest:

EDWARD M. FLETCHER, JR.
Attesting Officer

C. MARSHALL DANN
Commissioner of Patents